United States Patent [19]

Jackson et al.

[11] Patent Number: 4,900,126
[45] Date of Patent: Feb. 13, 1990

[54] BONDED ARRAY OF TRANSMISSION MEDIA

[75] Inventors: Kenneth W. Jackson, Snellville; Gregory A. Lochkovic, Lawrenceville; Parbhubhai D. Patel, Dunwoody; Michael L. Pearsall, Duluth; James R. Petisce, Norcross, all of Ga.

[73] Assignees: American Telephone & Telegraph Co., Murray Hill; AT&T Bell Laboratories, AT&T Technology, Inc., Berkeley Heights, both of N.J.

[21] Appl. No.: 213,876
[22] Filed: Jun. 30, 1988
[51] Int. Cl.$^4$ .............................................. G02B 6/44
[52] U.S. Cl. .................................................. 350/46.23
[58] Field of Search ................. 350/96.23, 96.3, 96.34

[56] References Cited

U.S. PATENT DOCUMENTS

| | | | |
|---|---|---|---|
| 3,864,018 | 2/1975 | Miller | 350/96.21 |
| 3,871,935 | 3/1975 | Gloge et al. | 156/158 |
| 3,920,432 | 11/1975 | Smith | 65/4 |
| 4,147,407 | 4/1979 | Eichenbaum | 350/96.34 |
| 4,176,910 | 12/1979 | Noethe | 350/96.23 |
| 4,547,040 | 10/1985 | Yamamoto et al. | 350/96.34 |
| 4,666,244 | 5/1987 | Van der Velde et al. | 350/96.23 |
| 4,828,349 | 5/1989 | Nakasuji | 350/96.33 |

FOREIGN PATENT DOCUMENTS

| | | | |
|---|---|---|---|
| 0270854 | 6/1988 | European Pat. Off. | 350/96.23 |
| 54-97440 | 8/1979 | Japan | 350/96.23 |
| 55-9565 | 1/1980 | Japan | 350/96.23 |
| 59-31905 | 2/1984 | Japan | 350/96.23 |
| 60-200213 | 10/1985 | Japan | 350/96.23 |
| 61-73114 | 4/1986 | Japan | 350/96.23 |
| 2184563 | 6/1987 | United Kingdom | 350/96.23 |

OTHER PUBLICATIONS

OFC/IOOC '87 Technical Digest, "Fiber Ribbon in a Slotted Core", M. Ogai, et al., Jan. 1987.
Journal of Lightwave Technology, vol. LT-4, No. 3, "Optical Coupling Between Coated Fibers in a Compact Fiber Ribbon", S. Hatano, et al., Mar. 1986.
International Wire and Cable Symposium Proceedings, "New Fiber Optic Ribbon Cable Design", W. Lackas, et al., 1986.
OFC Conference, "High-Speed Dual Coating and UV-Resin-Covered Fiber Ribbon", M. Ogai, et al., Feb. 1986.
Optical FIber Communication and 11th European Conference on Optical Communication, "Single Mode Optical Fiber Ribbon Cable for Subscriber Line", Katsuyama, et al., Oct., 1985, pp. 383–386.
Optical Communication, "Design and Performance of Several-Hundred-Core High-Density Optical Fiber Ribbon Cable", Katsuyama, et al., Oct. 1985, pp. 375-378.
Optical Fiber Communication and 11th European Conference On Optical Communication, "Design of Fiber Tape with Improved Lateral Pressure Resistance", Nirasawa, et al., Oct. 1985.

Primary Examiner—John D. Lee
Assistant Examiner—John Ngo
Attorney, Agent, or Firm—Edward W. Somers

[57] ABSTRACT

A bonded optical fiber array (20) includes a parallel coplanar array of longitudinally extending contacting optical fibers (22—22). Each optical fiber is enclosed in inner and outer layers of coating materials and is provided with a color identifier. The inner layer is comprised of a UV curable bonding material having a modulus in the range of about 1 M Pa. For mechanical protection, the outer layer is a UV curable bonding material having a modulus in the range of about 1 GPa. When the optical fibers are disposed in the parallel array, interstices are created between the fibers and between the fibers and an envelope which is spaced no further than about 25 μm at its closest point to each fiber. A UV curable matrix bonding material which has a modulus having a value less than that of the outer coating layer on the fiber and more than that of the inner coating layer fills the interstices, extends to the peripheral line which defines the envelope and bonds together the optical fibers. The modulus of the matrix material and the bond of the matrix material to the color identifier on the optical fibers is such that interfiber and interribbon movement is allowed. Also, accessing of the individual fibers is allowed upon the application of peeling forces by a craftsperson without the need for complex tools and without obfuscating the color identifier.

29 Claims, 3 Drawing Sheets

BONDED ARRAY OF TRANSMISSION MEDIA

TECHNICAL FIELD

This invention relates to a bonded array of transmission media. More particularly, it relates to a planar array of optical fibers in which each optical fiber is bonded to an adjacent fiber or fibers.

BACKGROUND OF THE INVENTION

Interest in bonded arrays of optical fibers has existed for some time. For example, optical fiber waveguide ribbons are of interest for the construction of multichannel transmission cable. In a typical optical fiber planar array called a ribbon, a plurality of fiber waveguides, typically twelve, are held in spaced positions parallel to each other generally in a common outer jacket or sheathing. Also, an outer surface of each of the optical fibers may be provided with a layer of a colorant material.

Optical fiber ribbon provides a modular design which simplifies the construction, installation and maintenance of optical fiber cable by eliminating the need to handle individual fibers. For example, the splicing and the connecting of the individual optical fibers in a ribbon is accomplished by splicing and connecting the much larger ribbon, if the fiber positions therein can be precisely fixed and maintained. Accurate alignment of the individual fibers during fabrication of the ribbon has presented a problem in the past. Additionally, a ribbon structure which maintains accurate alignment of the individual fibers during handling and use of the ribbon has been somewhat difficult.

These problems have been overcome with an adhesive sandwich ribbon, commonly referred to as ASR. The ASR includes a planar array of optical fibers held between two tapes. Each tape is a laminate comprising a relatively soft inner layer which contacts the optical fibers and a relatively hard outer layer which provides mechanical protection for the array. Typically, optical fiber ribbons have been made by causing a parallel array of optical fibers to be held between two flat longitudinally extending polyester tapes with each tape having an adhesive layer on one side. Generally, longitudinal side portions of the tapes overhang the optical fibers. See U.S. Pat. No. 4,147,407 which issued on Apr. 3, 1979 in the names of B. R. Eichenbaum and W. B. Gardner, and U.S. Pat. No. 3,920,432, which issued on Nov. 18, 1975 in the name of P. W. Smith. Also, each of the optical fibers may be provided with a colorant material for purposes of identification.

Such an optical fiber ribbon structure is advantageous in that it is modular and mechanically rugged, is compact, is suitable for simultaneous mass splicing and is relatively easy to manufacture. Mass splicing may be accomplished by means of a positive and negative chip arrangement such as is shown in U.S. Pat. No. 3,864,018 issued in the name of C. M. Miller on Feb. 4, 1975.

Because tapes must be aligned, tensioned and juxtaposed with a moving array of optical fibers, the processing speed of a tape-type ribboning line is not at an optimum. Reduced line speeds and the tapes which are used to hold the optical fibers add significantly to the cost of the ribbon. Further, there must be no crossovers of the optical fibers in the array in order to ensure error-free splicing.

The art has recognized at least some of these shortcomings. As a result, departures from the typical tape-type ribbon structure have become available in the marketplace. In some commercially available ribbons, the optical fibers are embedded in a mass of curable material and in some instances there is a covering layer of a relatively hard plastic material which provides the ribbon with mechanical protection. Typically, those current offerings are relatively thick, perhaps on the order of 0.450 mm, which may tend to warp.

A variation of the last-described ribbon structure in one in which an array of optical fibers are secured together with an adhesive matrix material which is disposed with only a minimal amount of adhesive material between each two adjacent fibers. Each optical fiber is provided with a single UV curable coating material or with dual coating materials comprising a primary coating material and a secondary coating material. A material such as a well known UV curable material which has been used to provide a secondary coating on the optical fibers is caused to be disposed between each two adjacent fibers. The final configuration may be one in which the adhesive material between adjacent fibers has a meniscus-type shape.

Although this type structure results in material savings, it has at least several disadvantages. First, it is difficult to obtain a planar array of optical fibers with the foregoing arrangement for bonding together the fibers. Also, because of the meniscus-type configuration of the adhesive material between adjacent optical fibers, optical fibers within adjacent arrays in a stack of ribbons tend to nest together. As a result, the optical fibers in each ribbon are not free to move as the cable is handled or during temperature swings. The use of a minimum amount of bonding material such as occurs in the meniscus structure ribbon also requires strong interfiber bonding with relatively high modulus material to prevent the ribbon from coming apart during cabling. The strong interfiber mechanical coupling can however restrict relaxation of fiber stresses and strains that are induced when the ribbon or cabled ribbon is fabricated and subsequently handled, installed or subjected to temperature swings. This is particularly true if the coating material directly adjacent to the fiber cladding has a relatively high modulus and the array bonding material also has a relatively high modulus. This may result in undesirable microbending with accompanying losses in performance or in the breakage of optical fibers or of an entire ribbon when a ribbon type cable is plowed into the ground.

The meniscus or any ribbon structure which includes an adhesive material that provide strong interfibers bonding also causes other problems. Attempts to mass strip the matrix material from all fibers in the array and to access single fibers from the array without breaking fibers or removing any colorant material from the accessed fiber and/or those adjacent to it may not be successful. Removal of colorant material from the fiber during access may destroy the color code identification of individual fibers making the ribbon less user friendly. Moreover, complex and expensive mechanical stripping tools may be required to remove the matrix material from the optical fibers.

Seemingly what the prior art lacks is an optical fiber ribbon structure which does not include tapes but one which overcomes problems associated with currently available, previously described non-tape ribbon. The sought-after structure should be one with sufficient interribbon and interfiber mobility to allow movement of the ribbons and the fibers during handling and installation without damaging the ribbon structure. Also, the sought-after structure should be mechanically rugged to withstand cabling operations and plowing of the cable into the ground during installation and should exhibit acceptable loss performance at temperatures as low as −40° F. Notwithstanding these requirements, the ribbon should be compact in size, and be strippable with access to the individual optical fibers from either a ribbon end or from midspan without removal of coloring material from the fibers and without the need for complex tools.

SUMMARY OF THE INVENTION

The foregoing shortcomings of the prior art have been overcome by the bonded array of transmission media of this invention. The array includes a plurality of longitudinally extending, individually coated optical fibers which are disposed in a parallel array. A matrix bonding material fills interstices between adjacent fibers and extends about the array of optical fibers such that the thickness of the bonding material outside each optical fiber as measured along the radii of the optical fibers does not exceed a predetermined value which may be about 25µm.

In a preferred embodiment, the array is a ribbon which includes a coplanar array of longitudinally extending parallel optical fibers with a matrix bonding material being disposed along each major side of the ribbon to provide a substantially flat surface on each of the two major sides of the array. The bonding material at an intersection with a radius of each optical fiber which is normal to a plane defined by the longitudinal axes of the optical fibers has a thickness in the range of about 12 to 25µm. The bonding material also fills the interstices formed between planes which extend across the ribbon and which are tangent to the optical fibers and adjacent optical fibers. The optical fibers in the array may not be contiguous to each other.

In another embodiment, each of the individually coated optical fibers is covered with a release agent which has an affinity for the bonding material or the fiber coating or the colorant material on the fiber coating which is controlled to be relatively low. As a result, a colorant material, typically an ink, on an outer surface of each optical fiber is not removed when the matrix bonding material is removed to access a fiber or fibers. Further, the use of a release agent makes it possible to adjust the interfiber coupling to be optimal with respect to the robustness of the array and the ease of single fiber access.

In a further embodiment, the bonding material which fills the interstices is the same as that which extends across the sides of the array. In another embodiment, a first bonding material which fills the interstices has a modulus which is substantially less than that of a second bonding material which covers the array. The dual coatings in this last-described embodiment can be applied in a single coating apparatus or in tandem coating operations.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
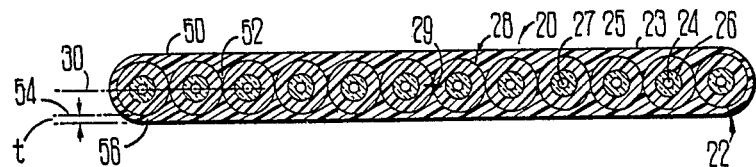
FIG. 1 is an end cross-sectional view of a bonded optical fiber ribbon of this invention.

Referring now to FIG. 1, there is shown a cross-sectional end view of a bonded optical fiber ribbon of this invention, which is designated generally by the numeral 20. The bonded ribbon comprises a plurality of individually coated optical fibers 22—22 each comprising a core 24 and a cladding 26. The optical fibers 22—22 are disposed in a parallel array 28 with a longitudinal axis 27 of each extending parallel to a longitudinal axis 29 of the ribbon. Each of the optical fibers 22—22 is provided with at least one layer 23 (see FIG. 1) of coating material to protect the optical fiber. It is not uncommon to provide dual coating layers with an inner layer having a modulus which is substantially less than an outer layer.

It is also with the scope of this invention for each optical fiber also to include a so-called buffer coating of a curable coating or an extrudable polymeric material, for example, which encloses the coating layer or layers. Typically the glassy optical fiber with a single or dual coating layers has an outer diameter of 250µm. The outer diameter of the optical fiber which includes single or dual coating layers enclosed in a buffer layer may be in the range of about 500–1000µm.

The array 28 is such that the longitudinal axes of the optical fibers are disposed in a plane 30. Further, the array is such that adjacent ones of the optical fibers may be in engagement with each other at a point of tangency.

Figure 2:
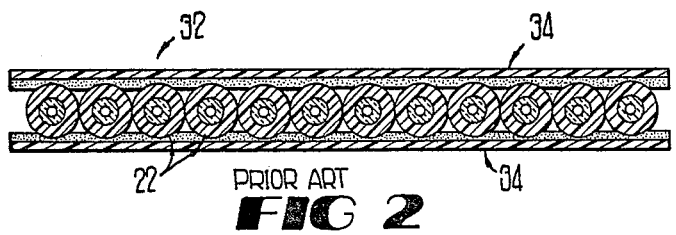
FIG. 2 is an end sectional view of a prior art optical fiber ribbon in which a plurality of optical fibers are held between two adhesive polyester tapes.

In the past, optical fiber ribbons took other forms. For example, in FIG. 2 these is shown an optical fiber ribbon 32 which comprises a flat array of longitudinally extending optical fibers 22—22. The optical fibers 22—22 therein are held together between two adhesively backed tapes 34—34. Generally, longitudinally extending side edges of the tapes overhang the array of optical fibers. these taped arrays, which are referred to as adhesive sandwich ribbons (ASR), provide superb performance and ruggedness, but are costly and the spatial compactness is not optimum. The bonded ribbon of this invention incorporates the excellent features of the ASR but is less costly and more spatially compact.

Figure 3:
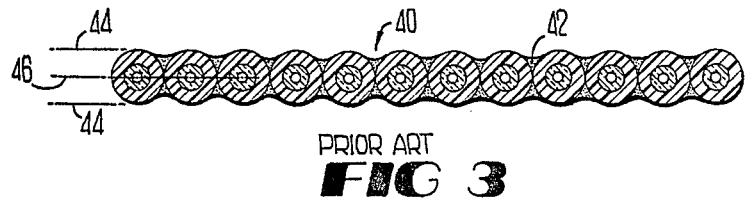
FIG. 3 is an end sectional view of a prior art optical fiber ribbon design.

A somewhat recent entry into the optical fiber ribbon market includes a bonded ribbon 40 (see FIG. 3) in which there are no tapes. Instead, interstices between adjacent ones of optical fibers 22—22 are held together by a UV curable bonding material 42 with a modulus of about 0.5 GPa. In it, the optical fibers 22—22 touch tangentially or are spaced slightly apart. The curable bonding material 42 does not extend to planes 44—44 which are parallel to a plane 46 which is defined by the longitudinal axes of the individual optical fibers. As can be seen in FIG. 3, the outer surface of the cured plastic material between two adjacent fibers which holds the adjoining fibers together has a meniscus-type shape. Such a structure is disclosed in a paper by W. Lockas, et al. entitled "New Fiber Optic Ribbon Cable design" and published in the 1986 proceedings of the International Wire and Cable Symposium. Although FIG. 3 depicts the longitudinal axes of the fibers occupying a single plane, this may be difficult to achieve in practice.

Other optical fiber ribbons have appeared in recent publications and in the marketplace. One of these does not use tapes but instead encloses an array of optical fibers in a UV curable bonding material. The bonding material not only fills interstices between the adjoining pairs of optical fibers but also forms covering layers on the outside of the array. The thickness of the outside cover in those is substantial. For example, for an array in which each optical fiber has an outer diameter of about 250 μm, the overall thickness of the ribbon is about 450 μm. In such a structure, the thickness of the covering layer of bonding material as measured along a radial line of each fiber extending from its longitudinal axis outwardly normally to the plane which is defined by the plurality of longitudinal axes is about 100 μm.

The optical fiber ribbon 20 of this invention differs in structure from the ribbons of the prior art but offers the proven advantages of the ASR structure. As can be seen by viewing FIGS. 1 and 4, the optical fibers 22—22 are held together in a matrix bonding material. Specifically, the optical fiber ribbon 20 includes a matrix bonding material 50 which bonds together adjacent optical fibers of the array. The matrix bonding material 50 fills each interstice 52 created between adjacent optical fibers 22—22. Further, the bonding material 50 in each interstice 52 extends outwardly on each flat or major side of the array to a plane 54 which is parallel to the plane 30 defined by the longitudinal axes 27—27 of the optical fibers and which is tangent to each of the fibers in the array. Still further, the coating material 50 may extend outwardly slightly beyond the plane 54 to provide a cover 56 on the outside of the array. The thickness "t" of the cover 56 between the outermost portion of the surface of the optical fibers and the outer surface of the cover as measured along a radial line extending from a center of the optical fiber outwardly and normally to the plane 30 which is defined by the longitudinal axes of the optical fibers is a predetermined value and may range from 0 to a relatively small value. For example, in a preferred embodiment the thickness "t" is typically in the range of about 12 to 25 μm.

Figure 4:
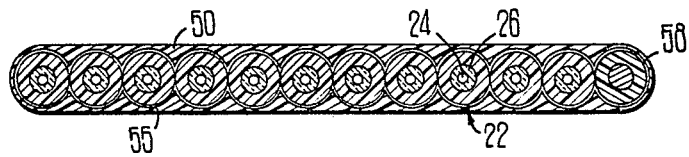
FIG. 4 is an end sectional view of a bonded optical fiber ribbon of this invention in which optical fibers each are provided with a coating of a release agent.

Also, it is within the scope of this invention for each array to include one or more metallic conductors. In FIG. 4, the bonded array is shown to include a metallic conductor 58 which may be individually insulated or insulated by the matrix material.

Another important property of the matrix bonding material is its modulus as related to temperature. Ideally, it is desired that the glass transition temperature of the bonding material be below −40° F. or above 180° F., that is, the modulus does not change significantly in the expected temperature range of operation. It is instructive to relate that modulus to the moduli of the coating materials for the optical fibers. As will be recalled, each optical fiber 22 is enclosed typically in two coatings, although it may be enclosed in only one. The inner one is relatively soft and has a modulus of about 1 MPa at a room temperature. This coating is used to cushion the optical fiber and to prevent microbending losses. Over the inner coating layer is disposed an outer coating layer which typically has a modulus of about 1 GPa at room temperature. The outer layer of coating material is used to provide the optical fiber with mechanical protection and some strength. As will be recalled, the ASR includes a soft inner layer and a relatively hard outer layer.

In the bonded ribbon structure 20 of this invention, the matrix bonding material 50 has a modulus which falls between the moduli of the inner and outer layers of coating materials in a dual coated fiber. Accordingly, the matrix bonding material 50 preferably is a UV curable bonding material having a modulus which is greater than about 1 MPa but which is less than about 1 GPa. The modulus must be sufficiently high to provide suitable mechanical integrity, but it cannot be so high as to affect adversely the loss performance of the optical fiber or access to the fiber by a craftsperson for splicing purposes, for example. The matrix bonding material 50 also must hold together the optical fibers, but at the same time allow for interfiber movement. A higher modulus material may be used as the bonding material when each optical fiber has dual coatings with the primary, inner coating layer comprising a relatively low modulus material.

The matrix bonding material 50 is a curable material such as a radiation curable material. It also may be a thermally curable material such as a polyimide based material or any thermally induced condensation polymerization.

A typical UV curable bonding material is a mixture comprising a resin, a diluent, and a photoinitiator. The resin may include a diethylenic terminated resin synthesized from a reaction of a hydroxyalkylacrylate with the reaction product of a polyester of polyether polyol of molecular weight of 1000 to 6000 Dalton with an aliphatic or aromatic diisoctyanate, or a diethylenic terminated resin synthesized from the reaction of glycidylacrylate with a carboxylic terminated polyester or polyether of molecular weight 1000 to 6000 Dalton. The diluent may comprise monofunctional or multifunctional acrylic acid esters having a molecular weight of 100 to 1000 Dalton or N-vinylpryyolidinone. For the photoinitiator, the composition may include ketonic compounds such as diethoxyacetophenoe, acetophenone, benzophenone, benzoin, antharquinone, and benzil dimethyl ketal. In a typical composition, the bonding matrix may include 50 to 90 weight percent resin, 5 to 40 weight percent diluents, and 1 to 10 weight percent photoinitiator. Other bonding matrices may include a methacrylate, a UV curing epoxy or an unsaturated polyester.

The bonded ribbon of this invention is advantageous from several standpoints. First, because of its thickness and because of its modulus, the matrix bonding material permits interfiber movement in the same ribbon. Also, the relatively thin cover 56 does not affect adversely the environmental performance of the optical fibers.

Several other advantages accrue because of the thickness of the bonded array of optical fibers relative to the outer diameter of the coated optical fiber in the array. Accessing of the individual fibers is relatively easy without the use of complex mechanical tools inasmuch as there is very little material to remove beyond each optical fiber. Notwithstanding the relatively low thickness of the bonding material, if any, beyond the optical fibers, nesting of optical fiber ribbons in a stack of ribbons is prevented. Although undesirable, nesting may occurring some prior art tapeless ribbons wherein the bonding material occupies only portions of the voids between adjoining fibers. Nesting is undesirable because it hinders individual transverse ribbon mobility in a stack of ribbons and results in microbending loss in a ribbon and possible breakage of fibers within the ribbon when plowed into the ground. Instead, in the bonded ribbon of this invention, transverse interribbon movement is facilitated.

It is also desirable that the bonded ribbon 20 have several other attributes. Typically, a colorant material is provided on the surface of the outermost coating layer of each optical fiber coating material or in the secondary coating material of the optical fiber itself. A color coded arrangement of optical fibers is of great help to craftspersons in the field. It should be apparent that when colored optical fibers are embedded in a bonding material to form a bonded ribbon, the fibers should be accessible without the loss of color. That is, when the bonding material is removed to access the optical fibers, the colorant material should not be removed from the optical fibers to an extent that the color identification is obfuscated. The matrix material of the bonded ribbons of this invention may be selected to have an interfacial bonding characteristic so that the bond interface of the matrix material to the colorant material is predictably weaker than the bonding interface of the colorant material to the outermost coating on the optical fiber.

An example of an undesirable matrix bonding material is one identical to the secondary coating on the optical fiber. In that case, the bond strengths between the colorant material and the fiber secondary coating and between the matrix and the colorant material would be equal and bond failure would be unpredictable, causing colorant material to be removed frequently from the fiber coating during the accessing of the fibers. Advantageously, it has been found that the matrix bonding materials of this invention do not remove colorant material from the surface of the optical fibers to a degree which destroys the identity pattern of the optical fibers in the ribbon.

In another embodiment, the coloring on the fiber surface can be preserved by applying a release agent 55 to an outer surface of each of the optical fibers, prior to the application of a bonding material to an array of the optical fibers (see FIG. 4). The release agent 55 creates a weak boundary layer at the interface of the colorant material to the matrix material. In a preferred embodiment, the release material may be a Teflon ® dry lubricant, for example.

The use of a release agent covering for the coated optical fibers may be advantageous in another way. For the array shown in FIGS. 1 and 4, the matrix bonding material may have a modulus which is so high in order to provide suitable bonding strength for the array that the optical fibers must be coated with a release agent to facilitate the accessing of the individual fibers in the field.

Generally then, the preservation of the color identification when the individual fibers are accessed is accomplished by balancing the modulus and adhesive bond strength against that need. If the modulus and bond strength are relatively high in order to meet requirements for mechanical properties, then either a release coating may be provided for each optical fiber or the matrix material is caused to be such that its polarity with respect to that of the colorant material or of the outer coating of the optical fiber ensures an easy release. In other words, the matrix material may be fine-tuned to enhance the release. Accordingly, the modulus of the matrix material and its bonding to the color coded optical fiber is such that interfiber movement is allowed and the fibers can be accessed individually without removing the colorant material from the fiber while providing suitable mechanical properties for the array.

Figure 5:
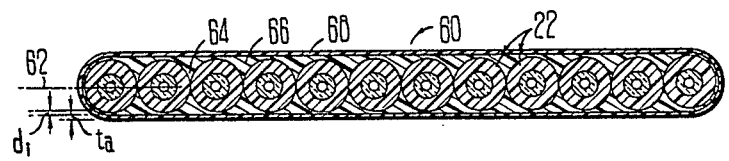
FIG. 5 is an end sectional view of another embodiment of a bonded optical fiber ribbon of this invention which includes dual matrix materials for enclosing and holding the optical fibers together.

Another embodiment of this invention is depicted in FIG. 5 and is designated generally by the numeral 60. The bonded ribbon 60 includes a plurality of optical fibers 22—22 each possibly including a primary and a secondary coating material or a single layer of coating material. As in the embodiment shown in FIG. 1, the optical fibers in the embodiment of FIG. 5 are disposed in a parallel, longitudinally extending planar array, such that the longitudinal axes of the fibers are disposed in a plane 62.

In this embodiment, interstices 64—64 between portions of adjacent fibers are occupied with an inner OV-curable matrix bonding material 66 which bonds together the fibers. Preferably, the matrix bonding material 66 has a modulus which is about equal to or slightly greater than that of the primary coating of the optical fibers. For example, in a preferred embodiment, the modulus of the coating material which occupies the interstices 64—64 and has an interface with the colorant material has a modulus of about 1 MPa and polarity different from that of the colorant material.

Covering the inner matrix bonding material 66 is an outer layer 68 of a UV-curable matrix bonding material which has a significantly higher modulus than that of the inner material. An order of magnitude of the modulus of the outer layer is one which does not exceed about 1 GPa. It is intended that the outer layer will provide mechanical protection and strength properties for the ribbon.

Also, and as should be apparent from the drawings, the thickness $t_a$ of the outer layer is relative by small. In this way, the higher modulus material does not overly restrict bending of the ribbon which would induce undesirably high microbending in the optical fibers and lead to fiber breakage. Typically, the thickness of the outer layer 68 does not exceed about 25 $\mu$m.

Another parameter which is important to the embodiment shown in FIG. 5 is the minimum distance $d_1$ by which the outer matrix bonding layer 68 is spaced from the optical fibers. This spacing is important because if it is too large, accessing the optical fibers may become a problem. On the other hand, if it is too small, the disposition of the higher modulus outer layer adjacent to the optical fiber may result in unwanted losses. In a preferred embodiment, the outer layer is spaced no more than about 25 $\mu$m from the optical fibers at the closest points of its periphery from the optical fibers.

Figure 6:
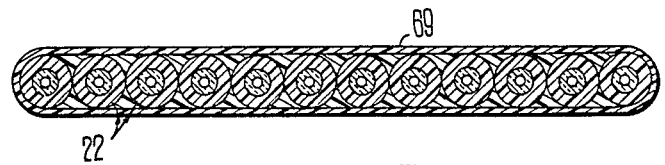
FIG. 6 is an end sectional view of another embodiment of the optical fiber ribbon shown in FIG. 5.

Another embodiment of the optical fiber ribbon of FIG. 5 is shown in FIG. 6. An outer layer 69 of a relatively high modulus material covers the array of optical fibers and a lower modulus material fills the interstices between the optical fibers. Unlike the outer layer 68 in FIG. 5, the outer layer 69 in FIG. 6 is disposed in engagement with the optical fibers. The relatively high modulus material also may be treated or otherwise caused to have a relatively low coefficient of friction when in engagement with another ribbon. In this way, interribbon mobility is facilitated during handling, installation and thermal changes. The high modulus material may also contain a colorant to facilitate identification of the ribbon.

Figure 7:
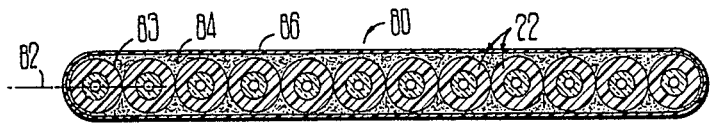
FIG. 7 is an end sectional view of still another embodiment of a bonded optical fiber ribbon of this invention which includes a filling material disposed in interstices about the fibers.
Figure 8:
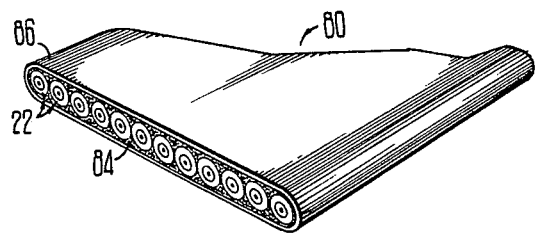
FIG. 8 is a perspective view of the ribbon of FIG. 7.

Still another embodiment which is shown in FIGS. 7 and 8 is designated generally by the numeral 80 and includes a flat array of optical fibers. Once again, the optical fibers are disposed so that their longitudinal axes define a single plane 82.

In this embodiment, interstices 83—83 between the optical fibers 22—22 are filled with a grease-like composition 84. Such a grease-like composition may be one such as that disclosed and claimed in U.S. Pat. No. 4,701,016 which issued on Oct. 20, 1987 in the names of C. H. Garside, et al. and which is incorporated by reference hereinto.

The grease-like material is advantageous in that it produces excellent interfiber mobility in a ribbon and is also a waterblocking material. Further, it allows easy stripability and single fiber access.

Enclosing the grease-like composition 84 is a layer 86 of UV curable material which has a modulus in the range of about 1 GPa. As in the embodiment depicted in FIG. 5, the layer 86 is spaced slightly from the optical fibers at their most proximate points. In this embodiment, the grease-like composition 84 not only fills the interstices between the optical fibers but portions thereof also are disposed between the covering layer 86 and the optical fibers.

Figure 9:
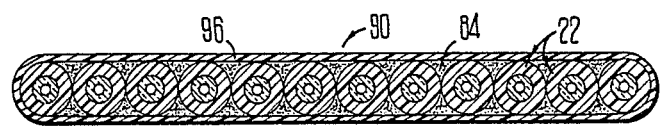
FIG. 9 is an end sectional view of another embodiment of the optical fiber ribbon shown in FIG. 7.

Another embodiment of the optical fiber ribbon of FIG. 7 is shown in FIG. 9 and is designated generally by the numeral 90. In the ribbon 90, the grease-like composition 84 fills the interstices between the optical fibers 22—22. An outer layer 96 of a relatively high modulus encloses the optical fibers 22—22 of the ribbon and unlike the embodiment shown in FIG. 7, is disposed in engagement with the optical fibers.

Although the invention has been described with respect to a ribbon, it should be apparent that other array forms are contemplated. For example, in FIG. 10, there is shown a bonded array which is designated generally by the numeral 100. The array 100 includes four optical fibers 22—22 each being provided with a colorant material and each of which may include a release coating 102. A center void 103 defined by the four fibers may be provided with a fibrous member 104 which may be a strength member. As can be seen, the array 100 includes a matrix bonding material 106 which is a bonding material for holding together the optical fibers. The matrix bonding material 106 fills voids between adjacent fibers but most likely does not enter the center void 103. Also, the matrix material 106 is defines by an envelope 108 which is arranged to cause the thickness of matrix material covering an outermost portion of each fiber not to exceed a value of about 25 μm.

Figure 11:
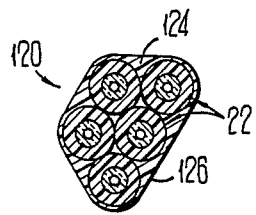

In FIG. 11, there is shown an array 120 which includes a plurality of optical fibers 22—22 each being provided with a colorant material on its outer surface. The optical fibers 22—22 in FIG. 11 are arranged in random fashion and are held together by a matrix material 124 being defined by an envelope 126. The matrix material may be the bonding material which is depicted in FIG. 1 and fills interstices between adjacent optical fibers and extends beyond lines which are tangent to adjacent fibers a distance which does not exceed about 25 μm. The optical fibers in this embodiment also may be provided with a release agent, if necessary for accessing the optical fibers. Should the modulus of the matrix bonding material be sufficiently low and yet satisfy the mechanical requirements for the array, a release material may be unnecessary.

Figure 12:
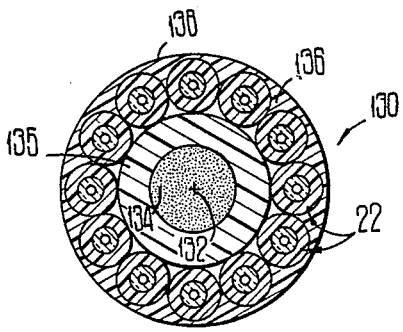

A further embodiment of an array of this invention is shown in FIG. 12 and is designated by the numeral 130. In this embodiment, a plurality of optical fibers 22—22 are arrayed about a central axis 132 with the axes of the fibers defining a circle. A strength member 134 may be disposed in a center void formed by the optical fibers. The strength member 134 may be made of a metallic or a non-metallic material. Also, it may be rod-like or it may be a fibrous material which may be provided with a colorant material for purposes of identification. Also, the strength member 134 is enclosed in a plastic buffering material 135 and may be provided with an adhesive coating to facilitate assembly of the optical fibers therewith. The optical fibers 22—22 are held together in a matrix bonding material 136 which fills interstices between adjacent optical fibers. As can be seen, the matrix bonding material 136 is applied to cause it to be contained within an envelope 138 which is circular in configuration. The optical fibers may extend parallel to the longitudinal axis of the member 134 or be twisted thereabout with unidirectional or alternating directional twists.

Figure 10:
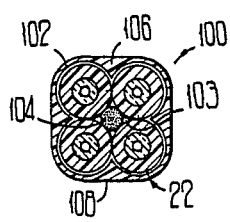
FIGS. 10–12 are end sectional views of other bonded arrays of this invention.

In each of FIGS. 10, 11 and 12, the modulus of the matrix material and its bonding to the optical fibers are such that interfiber movement is allowed and such that individual fibers may be accessed without compromising the mechanical properties of the array. Further, the envelope which circumscribes each array is such that the distance from the envelope to outermost peripheral points of the optical fibers does not exceed about 25 μm. Further, in the embodiments shown in FIGS. 10 and 11, the optical fibers in each array are straight and parallel to each other and to the longitudinal axis of the array.

Should a relatively high modulus matrix bonding material be used, a release coating may be required in order to assure accessing without obfuscation of the color identification. In the alternative, the matrix material may be fine-tuned to cause its polarity to be sufficiently different from that of the colored, coated optical fiber so that accessing is facilitated. On the other hand, if the modulus is sufficiently low, no release provisions may be necessary. Also, the envelope is structured to avoid nesting and the low values of cover thickness conserves material.

Figure 13:
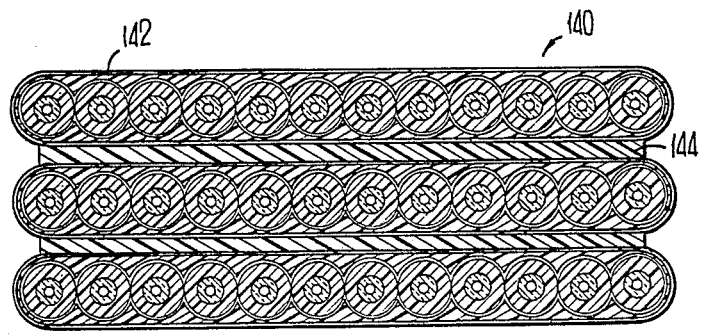
FIG. 13 is an end sectional view of a stack of bonded ribbons of this invention.

In FIG. 13, a plurality of bonded ribbons of this invention are arranged in a stock 140. Each ribbon may be provided with a release coating 142. Adjacent ribbons are bonded to each other by a matrix bonding material 144. The modulus of the bonding material 144 is in a range which allows interribbon movement but which provides suitable mechanical strength and suitable bonding strength for the stack. Further, each ribbon of the stack may be provided with a colorant material which could be translucent or intermittent so that the optical fibers therewithin can be identified.

It is to be understood that the above-described arrangements are simply illustrative of the invention. Other arrangements may be devised by those skilled in the art which will embody the principles of the invention and fall within the spirit and scope thereof.

We claim:

1. A bonded array of transmission media, which comprises:
   a plurality of longitudinally extending optical fibers which are disposed in an array with longitudinal axes thereof being substantially parallel to one another, each of said optical fibers including at least one layer of a coating material; and
   a curable matrix bonding material which fills interstices between adjacent fibers of said array and which extends to a periphery than envelops said array with the thickness of the matrix bonding material contiguous to the optical fibers and extending to the periphery as measured along radii of the optical fibers not exceeding a predetermined value, the modulus of said matrix bonding material at room temperature and its bonding to each optical fiber being such as to hold together said array while allowing interfiber movement and to facilitate the exposure of each fiber by the application of peeling forces between the matrix bonding material and an optical fiber while providing suitable mechanical properties for said array.

2. The bonded array of claim 1, wherein each of said optical fibers includes a coating of a release material which contacts said matrix bonding material to facilitate the separation of matrix bonding material from an optical fiber by the application of suitable peeling forces along the interface between said matrix bonding material and a selected optical fiber having the release coating.

3. The bonded array of claim 1, wherein the modulus of said matrix bonding material is fine-tuned to be sufficiently high to provide required mechanical properties for said array and the adhesion characteristics of the matrix bonding material to the coated optical fibers are such as to cause the matrix bonding material to have an affinity for the coated optical fiber which is sufficiently low to allow separation of the optical fiber from the matrix bonding material by the application of suitable peeling forces by a craftsperson.

4. The bonded array of claim 1, wherein each optical fiber includes a color identification material applied to an outer surface thereof and wherein the bonding characteristics of said matrix bonding material are sufficiently different from that of the color identification material of each said optical fiber to facilitate accessing of the individual fibers.

5. A bonded array of transmission media, which comprises:
   a plurality of longitudinally extending optical fibers which are disposed in an array with longitudinal axes thereof being substantially parallel to one another and to a longitudinal axis of the array, each of said optical fibers being provided with at least one layer of a coating material and with a color identification; and
   a curable matrix bonding material which fill interstices between adjacent fibers of said array and which extends to a periphery which envelopes said array with the thickness of the matrix bonding material contiguous to the optical fibers and extending from the optical fibers to the periphery as measured along radii of the optical fibers not exceeding a predetermined value, the modulus of said matrix bonding material at room temperature and its bonding to each color identified optical fiber being such as to hold together said array while allowing interfiber movement and to facilitate the exposure of the individual optical fibers upon the application of peeling forces between the matrix bonding material and an optical fiber without obfuscating the color identification of the optical fibers while providing suitable mechanical properties for the array.

6. The bonded array of claim 5, which also includes at least one metallic conductor.

7. The bonded array of claim 5, wherein adjacent fibers of said array are disposed such that longitudinal axes of the optical fibers are disposed in a plane.

8. The bonded array of claim 5, wherein said matrix bonding material is a radiation curable bonding material.

9. The bonded array of claim 5, wherein the color identification material is a solvent based ink which is applied to an exterior surface of each optical fiber.

10. The bonded array of claim 5, wherein said color identification comprises a constituent of an outermost coating layer of each said optical fiber.

11. The bonded array of claim 5, wherein a release agent is interposed between each said optical fiber and said matrix material.

12. The bonded array of claim 5, wherein said curable matrix bonding material has a modulus at room temperature which is in the range of about 1 MPa–1 GPa.

13. An optical fiber ribbon, which comprises:
   a plurality of longitudinally extending optical fibers which are disposed in a parallel array in which adjacent fibers are substantially contiguous to each other and in which longitudinal axes of the optical fibers are substantially parallel to a longitudinal axis of said array and disposed in a plane, each of said optical fibers being provided with at least one layer of a coating material and with a colorant identification material; and
   a radiation curable matrix bonding material which fills interstices between adjacent fibers to bond together the optical fibers and which extends across the array of optical fibers with the thickness of the matrix bonding material extending beyond the optical fibers and as measured along radii of the optical fibers which are normal to said plane not exceeding about 25 μm, said matrix bonding material having a modulus at room temperature and being bonded to said optical fibers such as hold together said array while allowing relative movement among the optical fibers and to facilitate the exposure of the individual optical fibers without obfuscating the color identification of the fibers while providing suitable mechanical properties for the ribbon.

14. The optical fiber ribbon of claim 13, wherein a UV curable matrix bonding material fills voids created between the optical fibers and major sides of said ribbon which extend across the array of optical fibers parallel to said plane and which are tangential to the optical fibers therein.

15. The optical fiber ribbon of claim 14, wherein the modulus of the matrix bonding material at room temperature is one which is less than about 1 GPa and more than about 1 MPa.

16. The optical fiber ribbon of claim 13, wherein said matrix bonding material is a first UV bonding material and said first matrix bonding material is enclosed by a layer of a second matrix bonding material.

17. The optical fiber ribbon of claim 16, wherein said first matrix bonding material is confined between planes which are tangent to said fibers.

18. The optical fiber of claim 16, wherein the modulus of said second matrix bonding material has a modulus which is substantially greater than that of the material which fills the interstices.

19. The optical fiber ribbon of claim 16, wherein the thickness of said layer of second matrix bonding material as measured along radii of said optical fibers in a direction normal to said plane does not exceed a value of about 25 $\mu$m.

20. The optical fiber ribbon of claim 19, wherein the modulus of said second matrix bonding material is in the range of about 1 GPa.

21. The optical fiber ribbon of claim 13, wherein each of the optical fibers is provided with a colorant material on an external surface thereof and wherein each of the optical fibers including the colorant material on a surface of each is provided with a release material which facilitates the accessing of individual ones of the optical fibers without the removal of the colorant material from the surfaces of the optical fibers.

22. The optical fiber ribbon of claim 13, wherein each of the optical fibers is enclosed in at least one layer of a coating material with the surface of the outermost layer of coating material being provided with a colorant material, the matrix bonding and coating materials being such that the bond between the colorant material and the outer surface of the outermost layer of coating material is greater than that of the bond between the colorant material and the matrix bonding material.

23. The bonded ribbon of claim 13, wherein each of said optical fibers is provided with at least one layer of a coating material and further each of the coated optical fibers is enclosed in a layer of a plastic buffering material disposed between the matrix bonding material and the coated optical fibers.

24. The bonded ribbon of claim 13, which is arranged in a stack of a plurality of the bonded ribbons with a bonding material being disposed between each two adjacent ribbons, the matrix bonding matrix material and the bonding material being such that shear strength therebetween is sufficiently low to allow interribbon movement.

25. A stack of bonded optical fiber ribbons, which includes a plurality of the optical fiber ribbons of claim 13 being stacked together with a bonding material being disposed between adjacent ribbons and having a modulus which facilitates accessing individual ribbons.

26. The stack of claim 25, wherein each of said ribbons is precoated with a release material prior to assembly into said stack.

27. The stack of claim 26, wherein each of said ribbons is provided with color identification means.

28. The stack of claim 27, wherein said color identification means is a colorant material provided about each said ribbon.

29. The stack of claim 27, wherein said color identification means is a constituent of said matrix bonding material of each of said ribbons.

* * * * *